F. M. NICHOLS.
CLUTCH.
APPLICATION FILED JUNE 20, 1908.
900,578.
Patented Oct. 6, 1908.
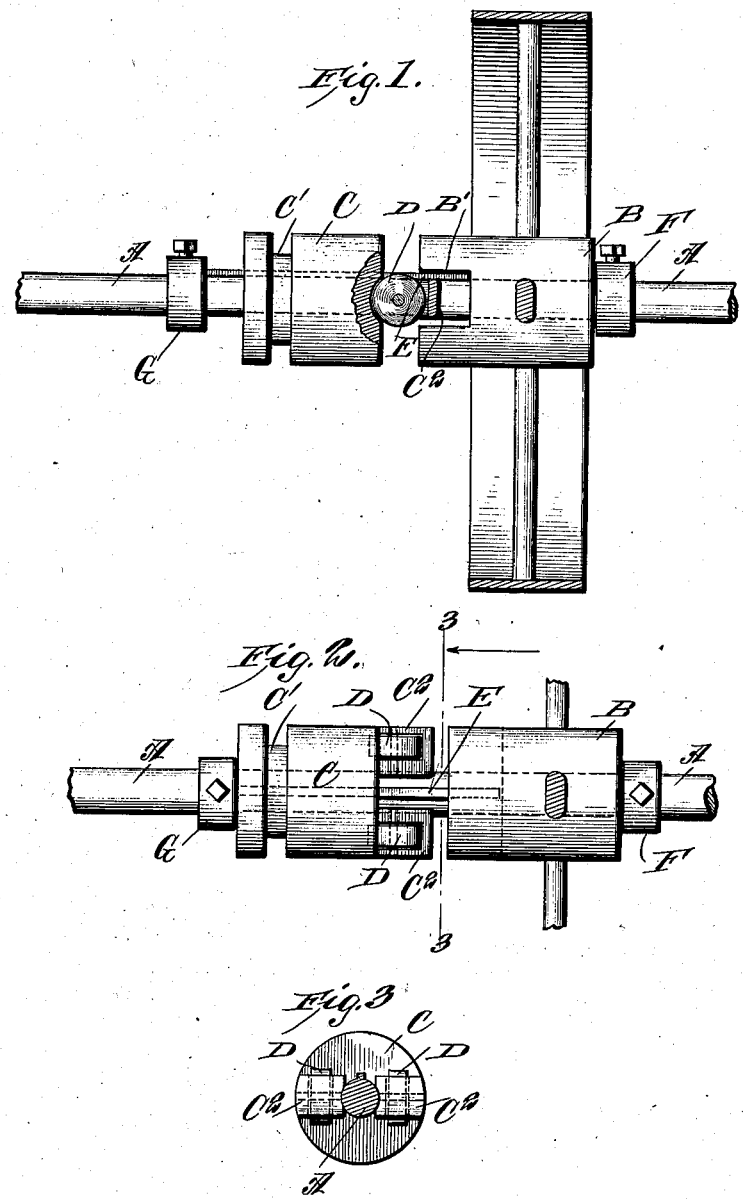
WITNESSES
INVENTOR
FRANCIS M. NICHOLS
BY
ATTORNEYS

UNITED STATES PATENT OFFICE.

FRANCIS M. NICHOLS, OF CHILLICOTHE, OHIO.

CLUTCH.

No. 900,578.        Specification of Letters Patent.        Patented Oct. 6, 1908.

Application filed June 20, 1908. Serial No. 439,488.

*To all whom it may concern:*

Be it known that I, FRANCIS M. NICHOLS, a citizen of the United States, and a resident of Chillicothe, in the county of Ross and State of Ohio, have invented certain new and useful Improvements in Clutches, of which the following is a specification.

This invention is an improvement in clutches, and has for an object to provide a novel construction which will be easy to operate and can be readily moved into and out of clutched position, such operation being aided by the provision of antifriction devices in the manner more fully described hereinafter; and the invention consists in certain novel constructions and combinations of parts as will be hereinafter described and claimed.

In the drawings, Figure 1 is a side view partly in section of a clutch embodying my invention. Fig. 2 is a top plan view thereof, and Fig. 3 is a cross section on about line 3—3 of Fig. 2.

In the form of square jawed clutch shown, I employ a shaft A, a section B loose thereon, and which may be termed the loose section, and is shown as a pulley, a drive section C, in the form of a sleeve keyed to and movable along the shaft A so it can be set into and out of engagement with the loose section, it being understood that in carrying out my invention the sections B and C are movable relatively toward and from each other, and I prefer to move the drive section C, and this may be accomplished by any of the ordinary devices for such purpose, to which end I provide the drive section C with an annular groove C'. One of the sections B is provided in its end next to the section C with a notch or notches B', of which I preferably employ two arranged diametrically opposite each other as will be understood from the dotted lines in Fig. 2, and these notches B' are adapted to receive longitudinally projecting arms C² on the drive section C, so that when the sections are moved toward each other to the position shown in Fig. 1, the arms C² of the section C may enter the notches B' of the section B and thus lock the sections so they will turn together, the section C thus operating to transmit the motion of the shaft A to the section B. To ease the motion of the arms C² into and out of the notches B' I provide antifriction devices to operate between the arms and the walls of the notch B'. I preferably support the antifriction devices in the arms C², and make the said antifriction devices in the form of rollers which are pivoted on radial axes to the arms C² with the axes of the opposite rollers D in alinement, the said rollers D preferably operating in openings formed in their respective arms as shown in the drawing.

It will be noticed the rollers project at their circumference beyond the opposite sides of the arms so that they will engage with their respective walls of the notch whether the shaft be turned in one direction or the other, thus facilitating the application and removal of the arms at all times.

The key E for the drive section C extends at one end as shown in full lines Fig. 1, and in dotted lines Fig. 2, to bear against a shoulder at the inner end of a recess formed in the hub of the pulley B, and operates to prevent the movement of the pulley in one direction, to the left as shown in Fig. 1, and a collar F on the shaft A holds the said pulley from moving in the other direction, a collar G being provided on the shaft A to limit the movement of the section C to the left in the arrangement shown in Fig. 1.

The construction is simple, easily operated and will be found efficient for the purpose for which it is designed.

I claim—

1. A clutch substantially as described comprising a drive section and a driven section movable relatively toward and from each other, and provided in their adjacent faces one with diametrically opposite notches, and the other with diametrically opposite arms projecting toward the first section and adapted to enter the notches thereof, and rollers pivoted to said arms on axes which aline, the said rollers projecting at their circumference beyond the opposite faces of their respective arms, substantially as and for the purposes set forth.

2. The combination in a clutch of a drive section and a driven section movable relatively toward and from each other, and provided at their adjacent faces one with a notch and the other with a projecting arm to enter said notch, and a roller pivoted in said arm on approximately a radial axis and projecting at its circumference beyond the opposite faces of the arm.

3. The combination in a clutch of a drive section and a driven section movable relatively toward and from each other, one of said sections being provided with an end notch and the other with a projecting arm to operate therein, and an anti-friction roller carried by the said arm and movable on an approximately radial axis and projecting at its circumference beyond the two side faces of the arm whereby it may operate against either side of the notch in the notched section.

4. A clutch comprising a drive section and a driven section movable relatively toward and from each other, and provided at their adjacent faces the one with diametrically opposite notches opening toward the other section, and the other with diametrically opposite arms projecting toward said first section, and adapted to enter the notches thereof, the said arms being provided with openings formed through them from side to side and approximately in a circumferential direction, and with rollers pivoted in said openings on approximately radial axes, and projecting at their circumference beyond the opposite faces of their respective arms, all substantially as and for the purposes set forth.

FRANCIS M. NICHOLS.

Witnesses:
SILAS F. GARRETT,
JESSIE M. JAKES.